(12) United States Patent
Bichsel

(10) Patent No.: US 6,299,922 B1
(45) Date of Patent: Oct. 9, 2001

(54) DEVICE AND METHOD FOR PUFFING GRANULAR MATERIAL

(76) Inventor: Rudolf Bichsel, 29, rue de Vieil-Armand, F-68500 Guebwiller (FR)

( * ) Notice: Subject to any disclaimer, the term of this patent is extended or adjusted under 35 U.S.C. 154(b) by 0 days.

(21) Appl. No.: 09/419,843

(22) Filed: Oct. 19, 1999

Related U.S. Application Data

(63) Continuation of application No. PCT/EP99/00797, filed on Feb. 6, 1999.

(30) Foreign Application Priority Data

Feb. 19, 1998 (DE) ................................. 198 06 951

(51) Int. Cl.⁷ ................. A23B 9/02; A23L 1/18
(52) U.S. Cl. ............... 426/450; 426/467; 426/469; 426/520; 99/323.4; 99/469; 99/471; 99/476; 99/477; 99/480
(58) Field of Search ................. 99/323.4, 323.5, 99/323.9, 426, 471, 286, 474, 476, 469, 323.6, 323.7, 323.8, 323.11, 477, 480; 426/625, 450, 467, 469, 520, 445

(56) References Cited

U.S. PATENT DOCUMENTS

| | | | |
|---|---|---|---|
| 2,602,134 | * 7/1952 | Nelson | 219/47 |
| 2,698,799 | 1/1955 | Rupp et al. | 99/82 |
| 3,128,690 | 4/1964 | Maehl | 99/238 |
| 3,661,071 | 5/1972 | Toei et al. | 99/238 |
| 3,701,667 | * 10/1972 | Heki et al. | 99/81 |
| 4,246,836 | * 1/1981 | Smith, Jr. | 99/478 |
| 4,478,862 | * 10/1984 | Greethead | 426/450 |
| 4,600,594 | 7/1986 | Bartesch et al. | 426/443 |
| 4,878,422 | * 11/1989 | McCullough et al. | 99/323.4 |
| 5,185,171 | * 2/1993 | Bersten | 426/467 |

FOREIGN PATENT DOCUMENTS

| | | |
|---|---|---|
| 656779 A5 | 7/1986 | (CH) . |
| 19521243C1 | 12/1996 | (DE) . |
| 19806951A1 | 8/1999 | (DE) . |
| 2020391 | 4/1991 | (RU) . |

* cited by examiner

Primary Examiner—Keith Hendricks
Assistant Examiner—Drew Becker
(74) Attorney, Agent, or Firm—St. Onge Steward Johnston & Reens LLC

(57) ABSTRACT

An apparatus for puffing granular material, in particular cereals and legumes, has a heating apparatus for preheating the granular material and a puffing reactor for puffing the material. For effective, fast, and uniform heating of the material, it is proposed that: the heating apparatus have a free jet fluidized bed without a flow impact floor in which a batch of the material to be heated can be acted upon, in a preheating operation synchronized with the puffing process and proceeding batchwise, by a heat-carrying gaseous medium.

18 Claims, 4 Drawing Sheets

DEVICE AND METHOD FOR PUFFING GRANULAR MATERIAL

CROSSREFERENCE OF PENDING APPLICATION

This application is a continuation of pending international application PCT/EP99/00797 filed on Feb. 6, 1999.

BACKGROUND OF THE INVENTION

1. Field of the Invention

The present invention relates to a device for puffing granular material, in particular cereals and legumes, having a heating apparatus for preheating the granular material, and having a puffing reactor for puffing the material.

The invention further concerns a method for puffing granular material, in particular cereals and legumes, in which the material is first heated in a heating apparatus, and the heated material is then conveyed to the puffing reactor.

2. Related Prior Art

A device and a method of this kind are described in DE 195 21 243 C1.

"Puffing" is understood to mean a treatment method for a granular material, in particular cereals and legumes, that is steam-treated under applied pressure and, when the pressure is abruptly discontinued, is inflated into looser masses. The products are marketed as, for example, puffed wheat, puffed rice, puffed corn, puffed beans, etc. It is also possible to treat other granular material, for example tobacco, in this fashion.

In the 1930s, the facilities were configured in such a way that the material to be treated was introduced into a horizontal rotating cylinder. First the material in the rotating cylinder was heated with gas flames until the steam pressure had risen to a specific value. Then heating with the gas flames was continued until a pressure of approximately 12 bar existed inside the cylinder. The cylinder was then abruptly opened, so that the material shot out and inflated.

Since this operation, which takes several minutes, is relatively time-consuming, in a development of this technology the preheating operation and the actual puffing operation were performed separately, so that these operations could take place concurrently.

In the case of the document cited initially, the material to be treated is first heated in a heating chamber, in which it is preheated to a preheat temperature of approximately 100° C. From the heating chamber, the material is conveyed into a holding container, where the material rests until it is transferred into the puffing reactor.

A similar device is known from GB-B-2 186 180. In this, the heating chamber is configured as a rotating chamber that is heated from outside with gas flames. The material to be heated is continuously passed through the rotating chamber, then drops out of it into a funnel-shaped holding container from which it is conveyed, via a screw conveyor, to the upper charging end of the puffing reactor, where it is once again temporarily transferred into a hopper.

A further design is known from EP-B-0 061 229, in which the material passes through several sieve-tray-like preheating chambers and is then transferred into hoppers, out of which the preheated material is then transferred into the actual puffing reactor.

A device for conditioning soybean fragments is known from CH 656 775 A5. In a fluidized bed system, the soybean fragments are fluidized using air that is introduced through a diffusion floor fitted with numerous nozzles. Heatable heat exchangers are arranged in the reaction space. The fluidized bed system operates continuously, i.e. soybean fragments are continuously introduced and discharged. Residence time is approximately 4 to 8 minutes.

The placement of heat exchangers in the reaction space interferes with fluidization and is hygienically dubious. The physical configuration of the diffusion floor is complex, and the long residence time and continuous operation are not suitable for combining with a puffing reactor that operates with short cycle times of 30 to 90 seconds.

In the case of DE 195 21 243 C1 cited initially, the puffing reactor is configured so that rapid and uniform heat distribution and heat transfer to the material present in the puffing reactor is accomplished, so that very short puffing cycles, in the range of 30 to 90 seconds, can take place.

This makes considerable demands in terms of the speed and uniformity with which the material is preheated in the upstream heating chamber.

Indirect application of heat to the material in the heating chamber, for example by the fact that the chamber wall of the rotating heating chamber is heated from outside with gas flames and that heat is transferred from the heated wall to the material moving along the inner side, requires a certain amount of time and is associated with high heat losses. Uniform heating of the material is also not always guaranteed, since rotating masses of material mix together in relatively uncontrolled fashion, so it is entirely possible for outer regions, which are in direct contact with the hot heating chamber wall for longer periods, to be more strongly heated than portions of the material located at the core of the rotating mass of material.

Maximum uniformity in the heating of the material is, however, a prerequisite for a uniformly good puffed product, since during the short heating period in the puffing reactor there is insufficient time available to completely equalize temperature differences in the batch of material.

It is therefore the object of the present invention to provide a remedy for this problem, and to improve a device and a method of the kind cited initially in such a way that rapid, uniform, and efficient preheating of the material can be achieved.

SUMMARY OF THE INVENTION

According to the present invention, the object is achieved by a device by the fact that the heating apparatus has a free jet fluidized bed without a flow impact floor in which a batch of the material to be heated can be acted upon, in a preheating operation synchronized with the puffing process and proceeding batchwise, by a heat-carrying gaseous medium.

In the case of a method, the object is achieved by the fact that a batch of the material is fluidized in a free jet fluidized bed without a flow impact floor, in a preheating operation synchronized with the puffing process and proceeding batchwise, using at heat-carrying medium, and is thereby uniformly heated.

The term "free jet fluidized bed without a flow impact floor" is understood to mean a design in which a batch of the material to be heated is blown up, by a powerful jet of the heat-carrying medium, into a jet-shaped fluidized bed in which no mechanical obstacles are present, so that the jet shape can develop unrestrictedly. A floor is not present, since its cross section serves as the air delivery opening.

The provision of a free jet fluidized bed allows direct and intensive contact between the heat-carrying medium and the material, so that efficient heat transfer can take place very rapidly without heat losses, i.e. without heating any heat-transferring walls.

Because the material is fluidized in a free jet fluidized bed by the heat-carrying gaseous medium, the individual particles of material are located relatively far apart from one another, so that the gaseous heat-carrying medium can flow completely around each individual particle of material, which again contributes to efficient and in particular to rapid and uniform heating.

This is even further promoted by the fluidizing operation, i.e. the high relative velocity between the heat-carrying gaseous medium and the fluidized material ensures rapid and uniform heating.

Uniform and constant conditions are present in the free jet fluidized bed, so that an entire batch, i.e. an entire charge of a puffing reactor (for example, 20 kg), can be uniformly and rapidly heated.

This rapid and highly effective heat transfer makes it possible, within the short puffing cycle times of approximately 90 seconds that are attainable, to deliver the material to the free jet fluidized bed, establish the fluidized bed, transfer the heat, and deliver the heated material to the puffing reactor, so that the time required for the actual heat-transfer operation in the fluidized bed is, for example, only approximately 80 seconds.

Because the procedure is timed to coordinate with the puffing reactor, there is no need for the heated material to stand or wait in holding containers between the heating chamber and the puffing reactor. This offers the considerable advantage of thereby preventing uncontrolled heat-initiated reactions from taking place in the heated material. One such reaction, for example, is the so-called Maillard reaction. This exothermic reaction, which is initiated by heat, results in undesirable browning of the material. Once the Maillard reaction has been initiated, it proceeds very rapidly because of its exothermic nature, and undesirable chain reactions can occur. This is now prevented by the fact that protracted holding periods are eliminated, and the preheated batch is immediately delivered to the puffing reactor in time with its cycle.

In a further embodiment of the invention, the free jet fluidized bed is configured as a vertical tube widening conically upward.

This feature on the one hand has the advantage that the free jet fluidized bed is constructed from physically very simple means, and its length and conical shape allow simple design adaptation to different material properties and different batch sizes and moreover make possible optimum development of the jet-shaped fluidized bed. The widening creates a defined zone in which the velocity of the blown-in and expanding jet has slowed sufficiently that the material separates from the gaseous medium and remains behind in the fluidized bed.

In a further embodiment of the invention, the free jet fluidized bed is arranged in a circuit in which the heat-carrying medium is circulated.

This feature offers the considerable advantage, in terms of process engineering, that the circulation system makes possible efficient and energy-saving heat delivery and transfer.

In a further embodiment of the invention, a heat exchanger and a circulating fan are arranged in the circuit.

The advantage of this feature is that by way of the heat exchanger, the necessary heat can be delivered directly to the circuit and to the medium circulating therein, so that here again operation is very thermally efficient. The circulating fan allows flexible adaptation to the material, i.e. individual adjustments can be made to the nature, size, and quantity of the material to be fluidized, so that in each case the most efficient heat transfer is attained in the shortest possible time.

In a further embodiment of the invention, vent valves are arranged on the delivery side and intake side of the circulating fan.

The advantage of this feature is that portions of the gaseous medium can be withdrawn via a venting valve that is provided on the delivery side, in order to remove moisture from the circuit. Fresh gaseous medium can then be fed into the circuit through an aeration valve that is provided on the intake side.

In a further embodiment of the invention, a cyclone separator or filter separator is arranged in the circuit.

The advantage of this feature is that in the circuit, the material being heated can be separated from smaller dust particles or other particles, which are entrained by the medium from the free jet fluidized bed and can be removed from the circuit in the cyclone separator or filter separator. This results later in an outstanding, dust-free end product.

In a further embodiment of the invention, the puffing reactor can be connected to the circuit via a branch circuit, so that the heated material can be delivered directly from the circuit to the puffing reactor via the branch circuit.

his feature has the considerable advantage that by switching in the branch circuit, the preheated material can be delivered by the heat-carrying medium directly to the puffing reactor. Because the product then stays in contact with the heat-carrying medium even during transfer, it cannot cool off but rather is delivered to the puffing reactor at the exact desired temperature. This is also extremely simple in design terms: there is no need to provide separate collecting and transport devices for conveying the hot material from the heating chamber into the puffing reactor.

In a further embodiment, the branch circuit branches off up-stream from the free jet fluidized bed, and there is arranged at the inlet of the free jet fluidized bed a control valve that in one position controls delivery of the gaseous medium into the circuit, and in a second position blocks the entry of medium into the free jet fluidized bed, which is then connected to the branch circuit.

This feature is extremely simple in terms of control engineering, and allows a rapid switchover from closed circulation in the circuit in order to heat the material, to the transport mode in order to convey the heated material via the branch circuit to the puffing reactor. Disconnecting the free jet fluidized bed reactor causes the fluidized bed to collapse suddenly, and the material can then be collected and delivered to the puffing reactor.

In a further embodiment of the invention, the inlet of the free jet fluidized bed is connected via a gravity line to a line of the branch circuit running below the inlet.

This feature offers the considerable advantage, in terms of process and control engineering, that gravity is utilized to convey the material into the branch circuit. Specifically, when the gas-carrying medium is no longer being introduced into the free jet fluidized bed, the fluidized bed collapses and drops under its own weight toward the bottom of the free jet fluidized bed. Because the gravity line has been provided, this material can now be admitted directly into the branch circuit line, and the material is then transferred, by way of the gas-carrying medium that in the meantime has been switched over into the branch circuit, to the puffing reactor.

This is very simple in terms of control engineering and design, and can be performed effectively and with little heat loss in very little time.

In a further embodiment of the invention, a cyclone separator, into which the heated material is conveyed, is arranged in the branch circuit directly upstream from the loading inlet of the puffing reactor.

This feature offers the considerable advantage that the material is transferred into the cyclone separator in very finely distributed fashion and while the heat-carrying medium is still flowing around it, and then separates from the medium therein.

This means that directly prior to transfer into the puffing reactor, the material is still in intensive heat exchange with the heat-carrying medium, so that the transport path to the puffing reactor can in fact be utilized for heat exchange, at least to maintain the thermal status that has been attained.

In the case of the devices cited initially, which operate with a relatively slow volumetric throughput but with large volumes and large quantities of heat (for example, by way of gas flames), local overheating can trigger Maillard reactions on individual particles of material. Because of the holding period between the heating chamber and introduction into the puffing reactor, there is then sufficient time available for such reactions to proceed in uncontrolled fashion. Leaving this entirely aside, considerable temperature gradients can also occur in these holding periods between the heating apparatus and the puffing reactor, since a particle that, at the beginning of the charging operation, falls to the bottom of the holding container, which is usually configured as a hopper, remains in it much longer than a particle gradually piled on top of it.

This is ruled out by the present invention, since such holding periods of different length for each particle are eliminated, and the material is in any case much more uniformly heated, so that even if a holding container is desirable for reasons of safety and operating continuity, uncontrolled and undesirable reactions cannot occur in it, or at least are greatly inhibited.

In a further embodiment of the invention, a delivery apparatus opens into the circuit in order to deliver material that has yet to be heated.

The advantage of this feature is that the material to be heated can be introduced into the circuit at a favorable point, e.g. in the bottom region of the free jet fluidized bed, from which it is then, immediately after activation of the circuit, fluidized into the turbulent zone of the free jet fluidized bed.

In a further embodiment of the invention, the puffing reactor is configured as a vertical reactor, and the free jet fluidized bed is arranged above an upper inlet end of the puffing reactor.

The advantage of this feature is that the preheated material can be conveyed directly from the free jet fluidized bed into the puffing reactor, for example by briefly interrupting the delivery of air through the free jet fluidized bed.

The result is not only that the material is quickly transferred, for example with the aid of gravity, into the puffing reactor without the risk of cooling or other changes. Another consequence is that in the working cycles in the free jet fluidized bed, heating can continue almost until the end of a time cycle, and the heated product can be conveyed into the puffing reactor immediately after the puffing reactor has been emptied and re-closed.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

The invention will be described and explained in more detail below with reference to a selected exemplary embodiment, in conjunction with the appended drawings, in which.

DETAILED DESCRIPTION OF PREFERRED EMBODIMENTS

Figure 1:
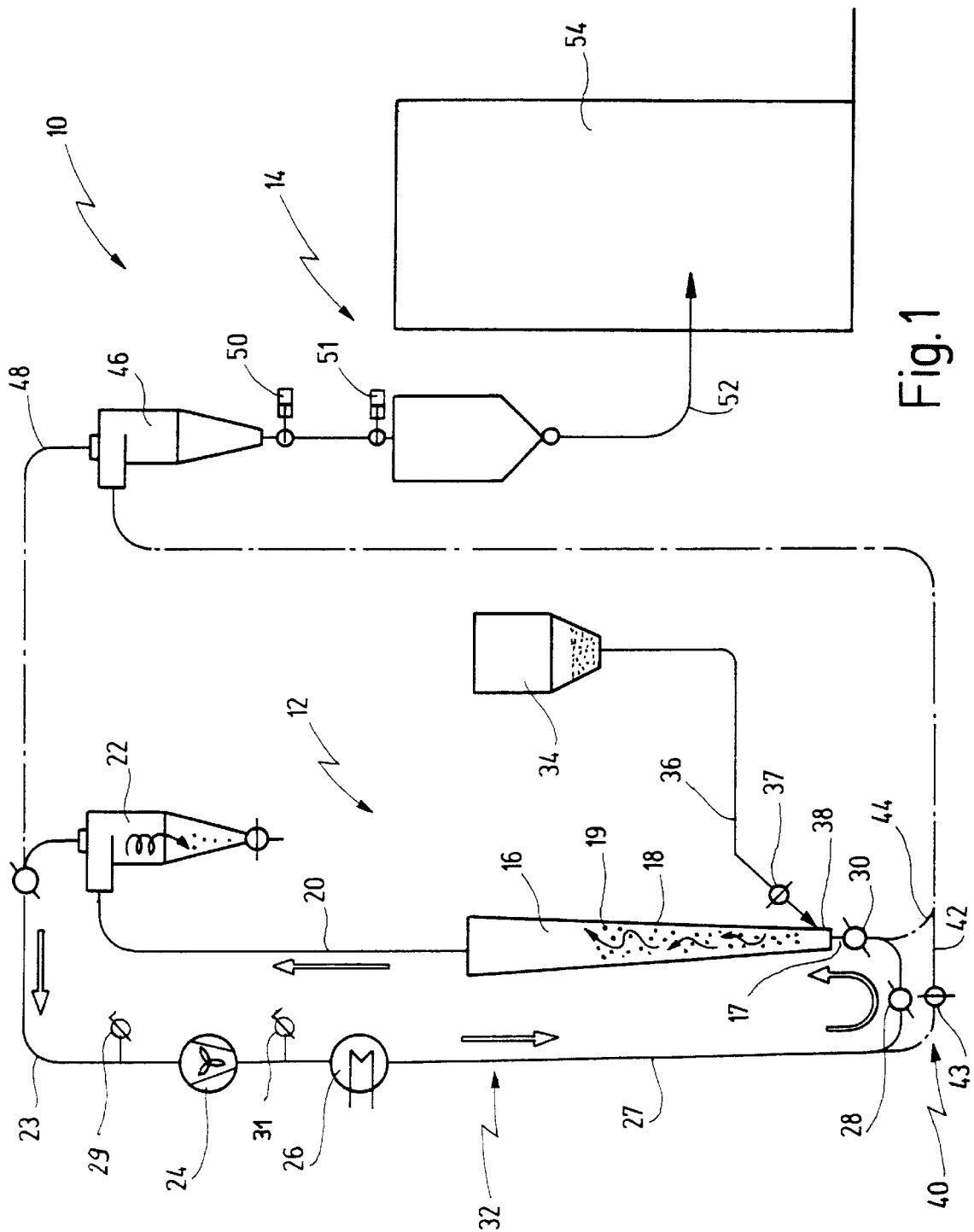
FIG. 1 shows, in highly schematic fashion, an overall view of a device in an operating state in which the circuit for heating the material in the free jet fluidized bed is closed.
Figure 2:
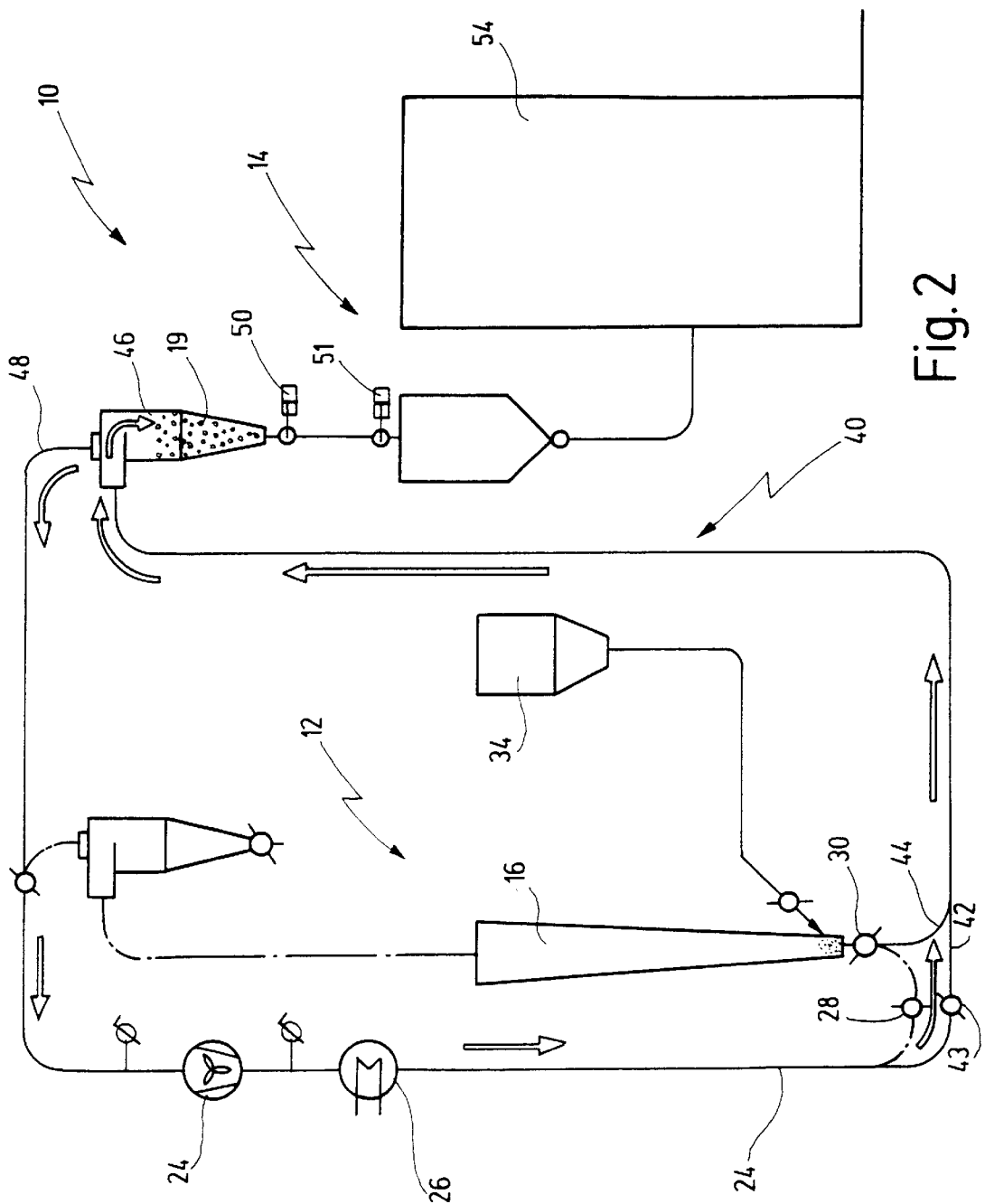
FIG. 2 shows a view, corresponding to FIG. 1, in which the branch circuit is connected in order to transfer the material out of the circuit to the puffing reactor.

A device for puffing granular material, specifically for puffing cereals, as shown in FIGS. 1 and 2, is labeled in its entirety with the reference number 10.

Device 10 has a heating apparatus 12 and, separately therefrom, a puffing reactor 14.

Heating apparatus 12 has a free jet fluidized bed 16 that is configured in the form of a vertical tube widening conically upward.

A line 20 leads from the upper end of free jet fluidized bed 16 to a cyclone separator 22.

From the upper end of cyclone separator 22, a line 23 leads to a circulating fan 24 which is followed by a heat exchanger 26.

An aeration valve 29 for the introduction of fresh air is arranged on the intake side of circulating fan 24. A venting valve 31 for discharging moisture-laden air is arranged on the delivery side of circulating fan 24.

A line 27 leads from heat exchanger 26 to inlet 17 of free jet fluidized bed 16. A control valve 30 is arranged at inlet 17; a flap valve 28 is arranged in line 27 directly upstream from control valve 30.

More details concerning configuration and operation will be described later in conjunction with FIG. 3.

The assemblage, self-contained in terms of lines, of free jet fluidized bed 16, cyclone separator 22, circulating fan 24, and heat exchanger 26 forms a circuit 32 as indicated by the arrows in FIG. 1.

A branch circuit 40 branches off directly upstream from flap valve 28.

Arranged in a line 42 of branch circuit 40 is a flap valve 43, following which a gravity line 44 constitutes a connection between control valve 30 and line 42 of branch circuit 40. Line 42 leads to a cyclone separator 46 directly above puffing reactor 14. Cyclone separator 46 is connected via metering slide valves 50 and 51 to the inlet or delivery end of puffing reactor 14.

At the outlet, puffing reactor 14 is connected via a line 52 to an expansion chamber 54.

A delivery apparatus 34 serves to deliver as-yet unheated material 29 to circuit 32; for that purpose, a delivery line 36 opens in bottom region 38 of free jet fluidized bed 16. A flap valve 37 allows delivery line 36 to be opened and closed.

Delivery line 36 can also be connected directly to the inlet via a multiple-way valve, so that the volume of one batch can be drawn in each case. Delivery line 36 can also open directly into line 27.

Device 10 operates as follows:

Circulating fan 24 circulates gaseous medium 25, which in the exemplary embodiment shown is hot air at approximately 160° C., in circuit 32. Heat is applied to the air via heat exchanger 26. Hot air 25 is conveyed via line 27 (see also, in particular, the enlarged representation of FIG. 3) to the bottom inlet 17 of free jet fluidized bed 16, where it shoots in as a jet over the entire inlet cross section and therein fluidizes the granular material 19 that is to be heated, as indicated by the flow arrows. A free jet-shaped gas flow develops, corresponding to the conical shape of tube 18.

Figure 3:
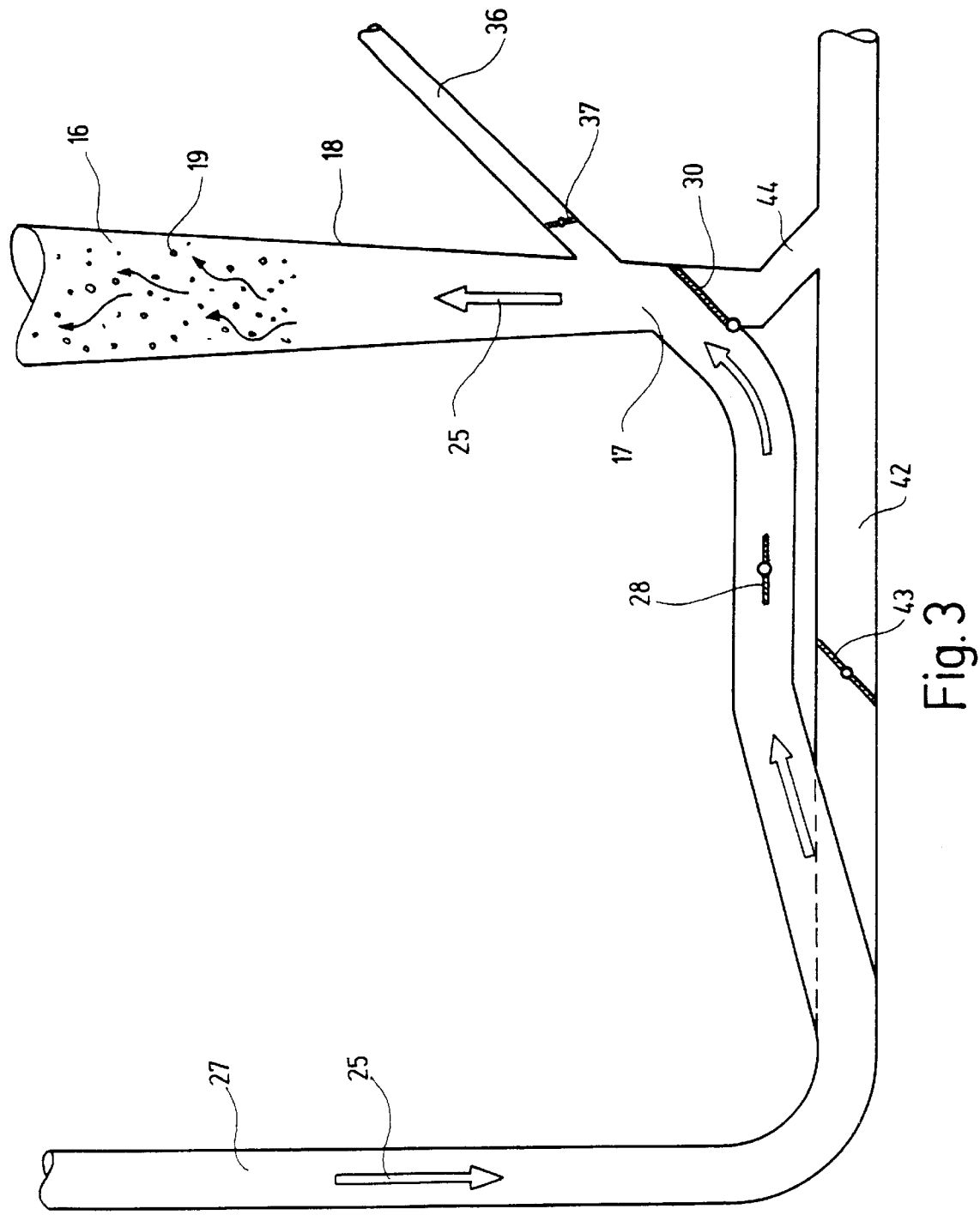
FIG. 3 shows a highly enlarged partial representation of the device in the vicinity of the bottom of the free jet fluidized bed, in the operating state of FIG. 1.

Flap valve 43 in line 42 is closed, flap valve 28 is open, and control valve 30 is in a pivoted position as shown in FIG. 3. In this position, air 25 is circulated in the closed circuit 32, thereby comes into intensive heat-exchanging contact with material 19, and heats it to the desired temperature of approximately 120° C. in a very brief period, i.e. approximately 30 to 90 seconds.

Very small dust particles entrained out of free jet fluidized bed 16 by air 25 are separated in cyclone separator 22 and can be removed from it from time to time.

Figure 4:
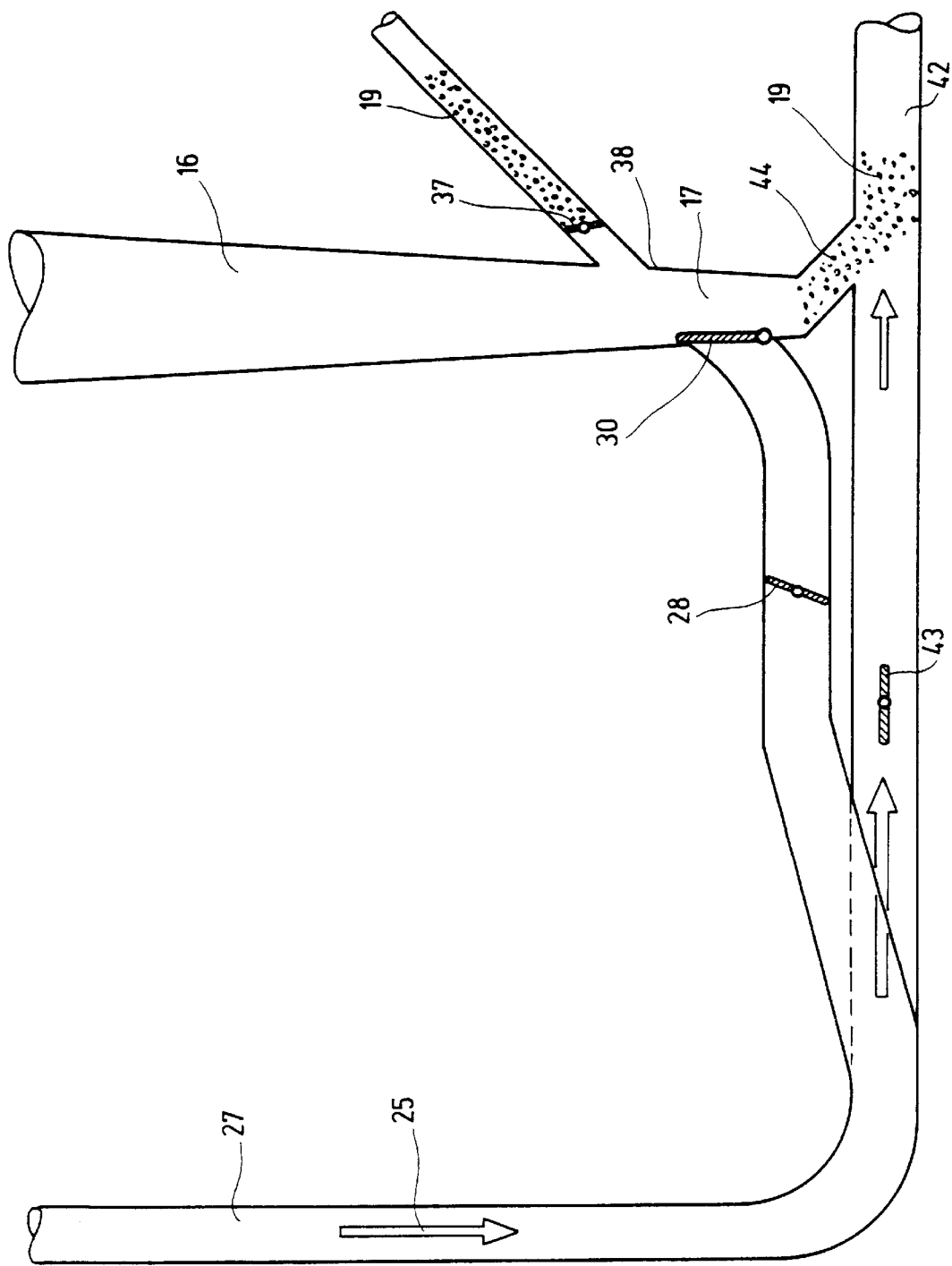
FIG. 4 shows a comparable portion, corresponding to the operating state in FIG. 2, for transferring the preheated material.

Once material 19 that is being heated has been sufficiently treated, control valve 30 is pivoted and is brought into a position as shown in FIG. 4. At the same time, flap valve 28 is pivoted into the blocking position, and flap valve 43 in line 42 is opened.

The result of this; is that the fluidized bed in free jet fluidized bed 16 abruptly collapses, and material 19, responding to gravity, falls toward the bottom or inlet 17 of free jet fluidized bed 16. This falling material 19 is conveyed via gravity line 44 into line 42. The heated material 19 conveyed into line 42 is then transported via branch circuit 40, by the hot medium 25 that: is still being circulated, to cyclone separator 46, as shown in FIG. 2. In cyclone separator 46, material 19 is separated from conveying medium 25. Medium 25 separated from material 19 is returned back to the intake side of recirculating fan 24 through a line 48.

The pathway shown with solid lines in FIG. 2 thus constitutes a branch circuit 40 that also passes through a portion of circuit 32, namely circulating fan 24 and heat exchanger 26. It is thus possible to use one and the same conveying and heat-exchanging apparatuses both to heat the material in circulating mode and to transfer the heated material; this is particularly efficient.

It is evident from the representation in FIG. 4 that when material 19 falls past control valve 30 and is discharged through gravity line 44 into the line 42, control valve 30 can be brought back into the position shown in FIG. 3. By opening flap valve 37, it is now possible to deliver a new batch of as-yet unheated material 19 from delivery apparatus 34 through line 29; in this process, flap valve 28 prevents material 19 from entering branch circuit 40.

Once flap valve 43 has been closed and flap valve 28 opened, material 19 is then forced into free jet fluidized bed 16 and fluidized therein.

The operations of heating as-yet unheated material 19 in free jet fluidized bed 16, transferring the heated material 19 to puffing reactor 14, and refilling free jet fluidized bed 16 with material 19 that has not yet been heated, can be effected at short time intervals using mechanically simple and therefore reliable means.

Material 19 is conveyed in batches, via slide valves 50 and 51, into puffing reactor 14, where it is then acted upon by steam and pressure in order to perform the puffing operation. After puffing reactor L4 is abruptly opened, material 19 shoots through line 52 (see FIG. 1) into expansion chamber 54, in which it inflates, drops to the bottom, and is further processed as product.

In the exemplary embodiment shown, free jet fluidized bed 16 is arranged next to puffing reactor 14, which is configured as a vertical reactor. As a result, these components are located approximately on one plane.

In a further embodiment, provision is made for placing free jet fluidized bed 16 directly onto puffing reactor 14. When the free jet fluidized bed is being emptied, the preheated material then falls directly into puffing reactor 14.

What is claimed, is:

1. A device for puffing a batch of a granular material, comprising:
   a heating apparatus for preheating a batch of a granular material without expanding said granular material,
   a puffing reactor for puffing said batch of said preheated material,
   said heating apparatus being provided with a free jet fluidized bed without a flow impact floor,
   means for providing a heat carrying medium, and means for feeding said heat carrying medium to said free jet fluidized bed, said heat carrying medium preheating said batch of said granular material fluidized in said free jet fluidized bed, said preheating being synchronized with a puffing process within said puffing reactor.

2. The device of claim 1, wherein said free jet fluidized bed is configured as a vertical tube widening conically up-ward.

3. The device of claim 1, wherein said free jet fluidized bed is arranged in a circuit in which said heat carrying medium is circulated.

4. The device of claim 3, wherein a heat exchanger and a circulating fan are arranged in said circuit.

5. The device of claim 4, wherein vent valves are arranged on a delivery side and an intake side of said circulating fan.

6. The device of claim 5, wherein filter means are arranged in said circuit.

7. The device of claim 6, wherein said filter means are designed as a cyclone separator.

8. The device of claim 1, wherein said free jet fluidized bed is arranged in a circuit in which said heat carrying medium is circulated, and wherein said puffing reactor can be connected to said circuit via a branch circuit, so that said preheated material can be delivered directly from said circuit to said puffing reactor via said branch circuit.

9. The device of claim 8, wherein said branch circuit branches off upstream from said free jet fluidized bed, and there is arranged at an inlet of said free jet fluidized bed a control valve that in one position controls delivery of said heat-carrying medium into said circuit, and in a second position blocks the entry of said heat-carrying medium into the free jet fluidized bed, which is then connected to said branch circuit.

10. The device of claim 9, wherein said inlet of said free jet fluidized bed is connected via a gravity line to a line of said branch circuit running below said inlet.

11. The device of claim 10, wherein a cyclone separator, into which said preheated material is conveyed, is arranged in said branch circuit directly upstream from a loading inlet of said puffing reactor.

12. The device of claim 11, wherein a delivery apparatus for delivering said granular material to be heated in said circuit, opens into said circuit.

13. The device of claim 1, wherein said puffing reactor is configured as a vertical reactor, and wherein said free jet fluidized bed is arranged above an upper inlet end of said puffing reactor.

14. A method for puffing a granular material with the steps of preheating a batch of said material in a heating apparatus and conveying said preheated material to a puffing reactor, wherein a batch of said granular material to be heated is fluidized in a free jet fluidized bed without a flow impact floor, in a preheating operation synchronized with a puffing process and said preheating operation proceeding batchwise, a heat carrying medium being blown into said free jet fluidized bed as a free jet fluidizing and preheating said granular material.

15. The method of claim 14, wherein said heat carrying medium is circulated in a circuit in which it passes through said free jet fluidized bed.

16. The method of claim 14, wherein, in order to transfer said preheated material into said puffing reactor, input to said free jet fluidized bed is interrupted so that the fluidized bed collapses and said preheated material collects in a bottom region, and said preheated material thus collected is transferred to said puffing reactor.

17. The method of claim 16, wherein said collected material drops via a gravity line into a branch circuit, through which it is then delivered, by way of said heat carrying medium circulating in said circuit to said puffing reactor.

18. The method of claim 14, wherein said free jet fluidized bed is arranged above a direct inlet end of said puffing reactor, and said preheated material is transferred directly, without intermediate storage, into said puffing reactor batchwise and synchronized with puffing cycles of said puffing reactor.

* * * * *